US008743886B2

(12) United States Patent
Pati et al.

(10) Patent No.: US 8,743,886 B2
(45) Date of Patent: Jun. 3, 2014

(54) MANAGING ACTIVE EDGE DEVICES IN VPLS USING BGP SIGNALING

(75) Inventors: Manas Pati, San Jose, CA (US); Samer Salam, Vancouver (CA); Keyur Patel, San Jose, CA (US); Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 12/987,815

(22) Filed: Jan. 10, 2011

(65) Prior Publication Data

US 2012/0177054 A1    Jul. 12, 2012

(51) Int. Cl.
*H04L 12/28* (2006.01)
*H04L 12/56* (2006.01)

(52) U.S. Cl.
USPC ............ 370/395.5; 370/395.53; 370/400; 370/409

(58) Field of Classification Search
None
See application file for complete search history.

(56) References Cited

U.S. PATENT DOCUMENTS

| | | | | |
|---|---|---|---|---|
| 7,593,395 | B2 * | 9/2009 | Ould-Brahim | 370/389 |
| 7,808,919 | B2 * | 10/2010 | Nadeau et al. | 370/248 |
| 7,899,044 | B2 * | 3/2011 | Rusmisel et al. | 370/389 |
| 7,961,599 | B2 * | 6/2011 | Proulx | 370/218 |
| 7,966,420 | B2 * | 6/2011 | Mehta et al. | 709/244 |
| 8,190,772 | B2 * | 5/2012 | Ould-Brahim | 709/242 |
| 2008/0056265 | A1 * | 3/2008 | Choi et al. | 370/392 |
| 2011/0149979 | A1 * | 6/2011 | Uttaro et al. | 370/401 |
| 2013/0194973 | A1 * | 8/2013 | Farkas et al. | 370/255 |

OTHER PUBLICATIONS

Kothari et al., "BGP based Multi-homing in Virtual Private LAN Service", Internet-Draft, Network Working Group, Oct. 25, 2010, 28 pages.
Callon R., "Use of OSI IS-IS for Routing in TCP/IP and Dual Environments," Network Working Group, Request for Comments: 1195, Dec. 1990, 85 pages.
Rekhter Y., "A Border Gateway Protocol 4 (BGP-4)", Network Working Group, Request for Comments: 1771, Mar. 1995, 57 pages.
Moy J., "OSPF Version 2", Network Working Group, Request for Comments: 2328, Standards Track, Apr. 1998, 244 pages.
Rosen E., "Multiprotocol Label Switching Architecture", Network Working Group, Request for Comments: 3031, Standards Track, Jan. 2001, 61 pages.
Rosen E. et al., "MPLS Label Stack Encoding ", Network Working Group, Standards Track, Jan. 2001, 23 pages.
Kompella K. et al., "Virtual Private LAN Service (VPLS), Using BGP for Auto-Discovery and Signaling", Network Working Group, Request for Comments: 4761, Standards Track, Jan. 2007, 28 pages.
Anderson L., et al. "LDP Specification", Network Working Group, Request for Comments: 5036, Standards Track, Oct. 2007, 135 pages.

* cited by examiner

*Primary Examiner* — Ayaz Sheikh
*Assistant Examiner* — Blanche Wong
(74) *Attorney, Agent, or Firm* — Hickman Palermo Truong Becker Bingham Wong LLP

(57) ABSTRACT

In one embodiment, a method includes establishing in a Virtual Private Local Area Network (LAN) Service (VPLS) over Multi-Protocol Label Switching (MPLS) network a floating pseudowire between a first provider edge router and a redundancy group having a plurality of provider edge routers each configured to forward data toward a external device. Each provider edge router in the redundancy group is configured to maintain an active link to the external device. A provider edge router that is not a member of the redundancy group sends data directed to the external device through the floating pseudowire. Only one provider edge router in the redundancy group receives and forwards the particular data to the external device.

18 Claims, 9 Drawing Sheets

MANAGING ACTIVE EDGE DEVICES IN VPLS USING BGP SIGNALING

TECHNICAL FIELD

The present disclosure generally relates to computer networks. The disclosure relates more specifically to increasing bandwidth and resiliency in a virtual private local area network (LAN) environment.

BACKGROUND

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

Network service providers may provide Ethernet connectivity across geographically disperse data centers as though each device is connected via a local area network. In particular, a Virtual Private LAN Service (VPLS) may provide a Layer 2 VPN that emulates a multipoint Ethernet LAN. VPLS "glues" together several individual LANs across a packet switched network to appear and function as a single LAN. VPLS incorporates Media Access Control (MAC) address learning and relies on network discovery protocols such as Border Gateway Protocol (BGP) to set up pseudowires between every pair of edge routers. A pseudowire is a tunnel that transports Layer 2 frames such as Ethernet over a Multi-Protocol Label Switching (MPLS)/Internet Protocol (IP) network. Pseudowires may be identified by an MPLS label which identifies the virtual LAN and the source provider edge router. More information on VPLS is provided in Request for Comment (RFC) 4761 of the Internet Engineering Task Force (IETF), and familiarity with RFC 4761 is presumed in this disclosure.

Border Gateway Protocol (BGP) can be used for auto-discovery and signaling by network provider edge devices. A BGP-enabled network element (a BGP host or peer) may exchange network reachability information with other BGP-enabled network elements. The most commonly implemented version of BGP is BGP-4, which is defined in RFC1771 (published by the Internet Engineering Task Force (IETF) in March 1995).

The Label Distribution Protocol (LDP) is defined by IETF RFC 5036 for the purpose of distributing labels in an MPLS environment. LDP relies on network routing information such as is provided by Internal Gateway Protocol (IGP) or Open Shortest Path First (OSPF). The router forwarding information base, or FIB, is responsible for determining the hop-by-hop path through the network. LDP assigns and distributes labels for each path in the internal network.

Routers may send an IGP route advertisement, as defined in RFC 2328, RFC 1195, to advertise its participation in the network used for transport of VPLS service frames. The advertisement may include a list of active connections with neighboring routers. A provider edge router may send a BGP Layer 2 Network Layer Reachability Information (NLRI) (described in RFC 4761) for establishing pseudowires with each other provider edge router. Each edge router has a unique identifier within the VPLS network which is the VPLS Edge ID.

As frames traverse the network, a table is created that associates the MAC address with the pseudowire over which they were received. There is only one table entry per MAC address. Each time a frame is received with a different MAC address/pseudowire mapping, the table is updated to reflect the change.

The internet-draft document entitled draft-ietf-12vpn-vpls-multihoming describes extending the signaling procedures of RFC 4761 by defining a "Multi-homing NLRI" where a multi-homing ID is used in place of the VPLS Edge ID. Multi-homing allows a single VPLS ID to represent multiple edge routers. This may be used when a customer edge device is connected to more than one edge router (i.e. is multi-homed). However, multi-homing BGP is intended to be used in the context where a multi-homed customer edge device is connected to only one active edge router at a time. Other edge routers to which the CE may be connected are standby routers in case failover becomes necessary. Thus, at any point in time, there is only one active edge router over which to send and receive traffic.

MPLS effectively allows the creation of high-speed switches, circumventing the processing of more extensive header information in higher level protocols, such as IP. MPLS also provides the ability to support multiple service models, do traffic management, and perform other networking functions, with a relatively simple header. MPLS appends an MPLS header containing one or more 'labels' called a label stack in front of headers of other higher layer protocols. MPLS is described in IETF RFC 3031 and RFC 3032. All of the IETF RFC's mentioned in the instant application are available at the time of this writing on the World Wide Web (www) at domain ietf.org and are hereby incorporated by reference as if fully set forth herein, and familiarity with the RFCs is assumed.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
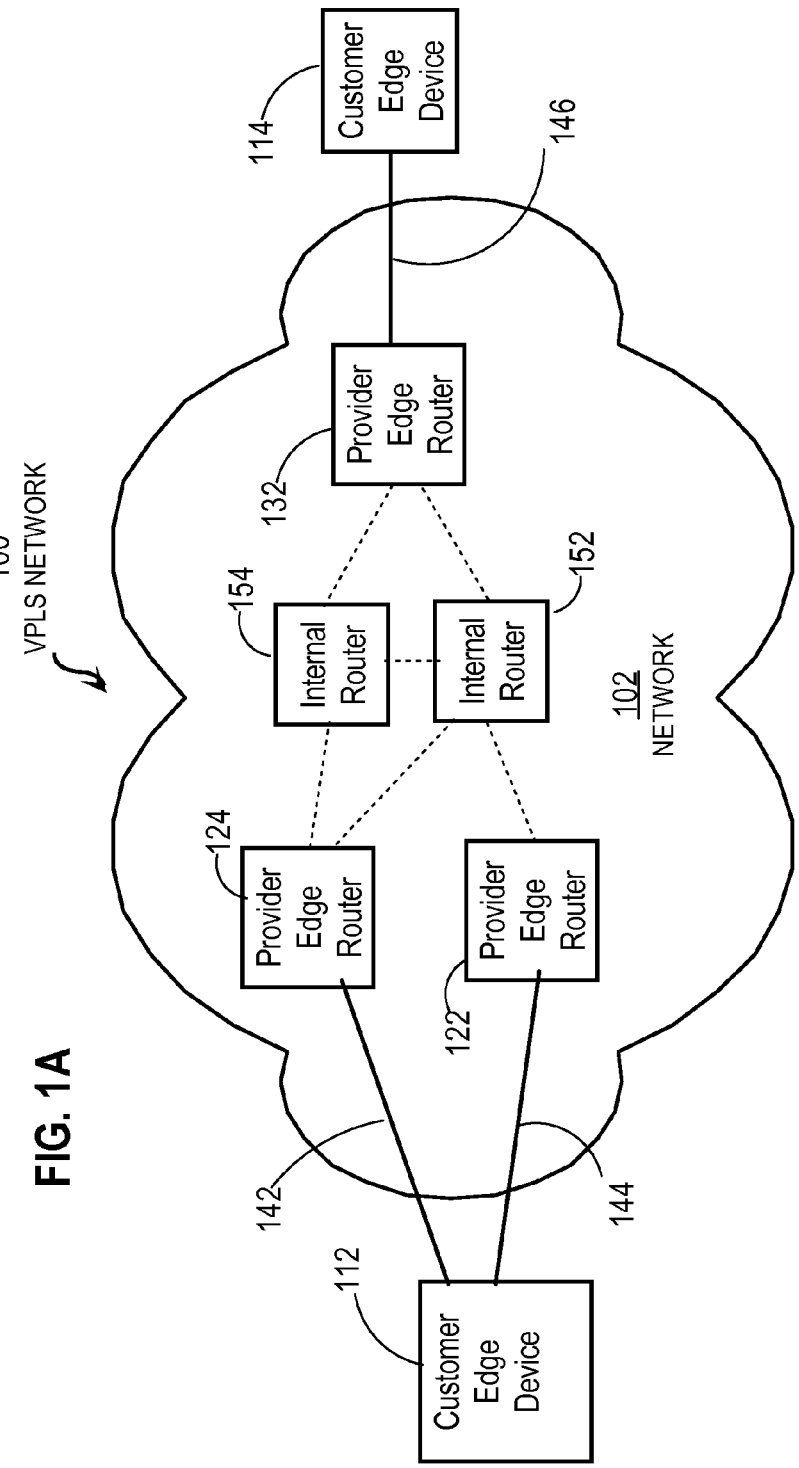
FIG. 1A illustrates an example VPLS network.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

The approaches herein are described in the context of sending messages between customer edge devices across a multi-site virtual private LAN. Past approaches may have provided for a single active connection between each customer edge device and a provider edge router. Even when a customer edge device is multi-homed to multiple provider edge routers, only one connection is active with one or more standby routers ready to take over in case of failure.

The approaches described herein provide for multiple simultaneous active connections between a customer edge device and multiple provider edge routers, allowing for bi-directional, flow-based load balancing and increased bandwidth as well as for more dynamic failover capabilities.

In an embodiment, each time a frame is received at a participating router from a pseudowire that is different than the pseudowire stored in association with a packet's MAC address, the association is updated. In a fully meshed network, each edge router with an active connection to the same customer edge device would have a distinct pseudowire connected to every other edge router, where the other edge routers do not have a connection to the customer edge device. Traffic from a customer edge device may be forwarded to any of the edge routers with an active connection to the customer edge device. Thus, a particular edge router may see data frames for the same MAC address associated with different pseudowires over time. This may lead to instability of the MAC address table.

Multiple active connections between provider edge routers and a customer edge device may result in frames that can loop. For example, a frame sent from a customer edge device to another customer edge device through an active, directly connected edge router may be routed through another edge router that also has an active direct connection to the sender. As a result, the frame may loop back and the customer edge device may receive the frame that it originally sent.

When the network uses flooding to deliver multi-destination messages, each of the provider edge routers with an active connection to a common, multi-homed customer edge device may receive messages that are directed to the customer edge device, and the customer edge device may be forwarded multiple copies of the same message. The techniques described herein prevent the delivery of duplicate frames when there are multiple concurrently active connections to the customer edge device. One approach is to only send a frame to one of the routers in the redundancy group. The path table is extended to include multiple paths for each floating pseudowire, and the paths are selected in a load balancing process to determine which provider edge router will receive the frame.

In an embodiment, a redundancy group is created that is comprised of provider edge routers, each of which has an active connection to the same customer edge devices. The routers in the redundancy group operate collectively to provide a high bandwidth, highly available connection to the customer edge device. Routers in the redundancy group each represent the group as a whole. Rather than creating a full mesh of pseudowires between every pair of provider edge routers, a single floating pseudowire is created per remote provider edge router for communicating with the redundancy group as a whole. That is, instead of a particular edge router having separate pseudowires with each of the routers in the redundancy group, the floating pseudowire is used for communication between the particular edge router and any one of the routers in the redundancy group. A pseudowire with a redundancy group as an endpoint is referred to herein as a floating pseudowire, because the pseudowire endpoint conceptually floats among the edge routers in the redundancy group. As a result, each customer MAC address is associated with a single floating pseudowire.

VPLS Network Example

FIG. 1A shows an example VPLS Network 100 such as might be deployed by a network service provider in an embodiment. In an embodiment, network 100 comprises three Provider Edge Routers (122, 124, and 132) and two Internal Routers (152,154). A "Provider Edge Router" may be referred to herein as a "PE" and an internal router may be referred herein to as a "P." Customer Edge Device 112 exchanges messages with Customer Edge Device 114 through Network 102. Provider Edge Router 132 is connected to Customer Edge Device 114, and Customer Edge Device 112 is multi-homed with connections to both Provider Edge Router 122 and 124. The connections between Customer Edge Device 112 and the Provider Edge Routers 122 and 124 are both active. That is, traffic may be sent over either connection, and the connections may be load balanced to optimize throughput. Each dotted line represents an active link to/from an internal router. For example, to send data from PE 124 to PE 132, the data may be routed through either P 154 or P 152.

Figure 1B:
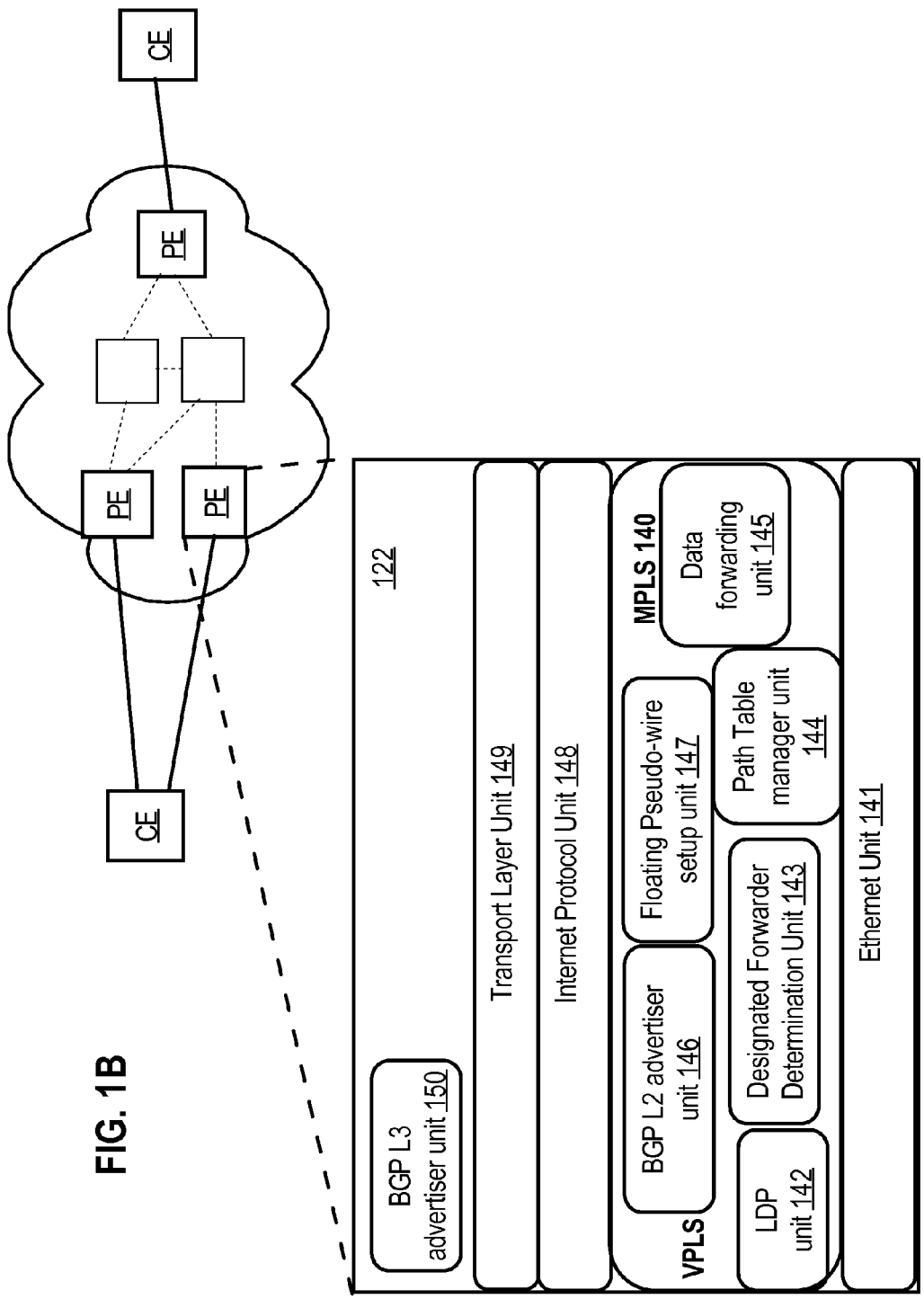
FIG. 1B illustrates example software units running on a provider edge router.

FIG. 1B illustrates examples of software units running on a provider edge router such as Provider Edge Router 122. In this example, VPLS offers Layer 2 connectivity across multiple LAN instances over an MPLS network using Ethernet. The Label Distribution Protocol (LDP) 142 assigns an MPLS label to IP prefixes within Network 100.

In an embodiment, BGP Layer 2 Advertiser Unit 146 advertises to other routers in the network the address of a router along with VPLS service discovery information. In an embodiment, Floating Pseudowire Setup Unit 147 establishes a floating pseudowire between an edge router and a redundancy group of edge routers that are multi-homed to a particular customer edge device. In an embodiment, LDP Unit 142 assigns labels to IP prefixes. It constructs the LDP table.

In an embodiment, Designated Forwarder Determination Unit 143 determines which of the provider edge routers that are actively connected to a multi-homed customer edge device will specify the pseudowire label to associate with the redundancy group.

In an embodiment, BGP Layer 3 Advertiser Unit 150 participates in Layer 3 BGP to exchange IP route information. BGP Layer 3 Advertiser Unit 150 provides an IP address of the provider edge routers as well as a prefix for each network that it is connected to. For each network that is reachable, the Layer 3 advertisement specifies a next hop address.

In an embodiment, Path Table Manager Unit 144 creates and maintains the information in the Path Table. Path Table Manager Unit 144 uses information from the routing advertisements to build the path table. The path table includes routing information for every internal path labeled by LDP as well as paths for the pseudowires.

In an embodiment, Data Forwarding Unit 145 is responsible for receiving an incoming frame, selecting the path to forward the frame on, and sending out the frame on the selected path.

Figure 1C:
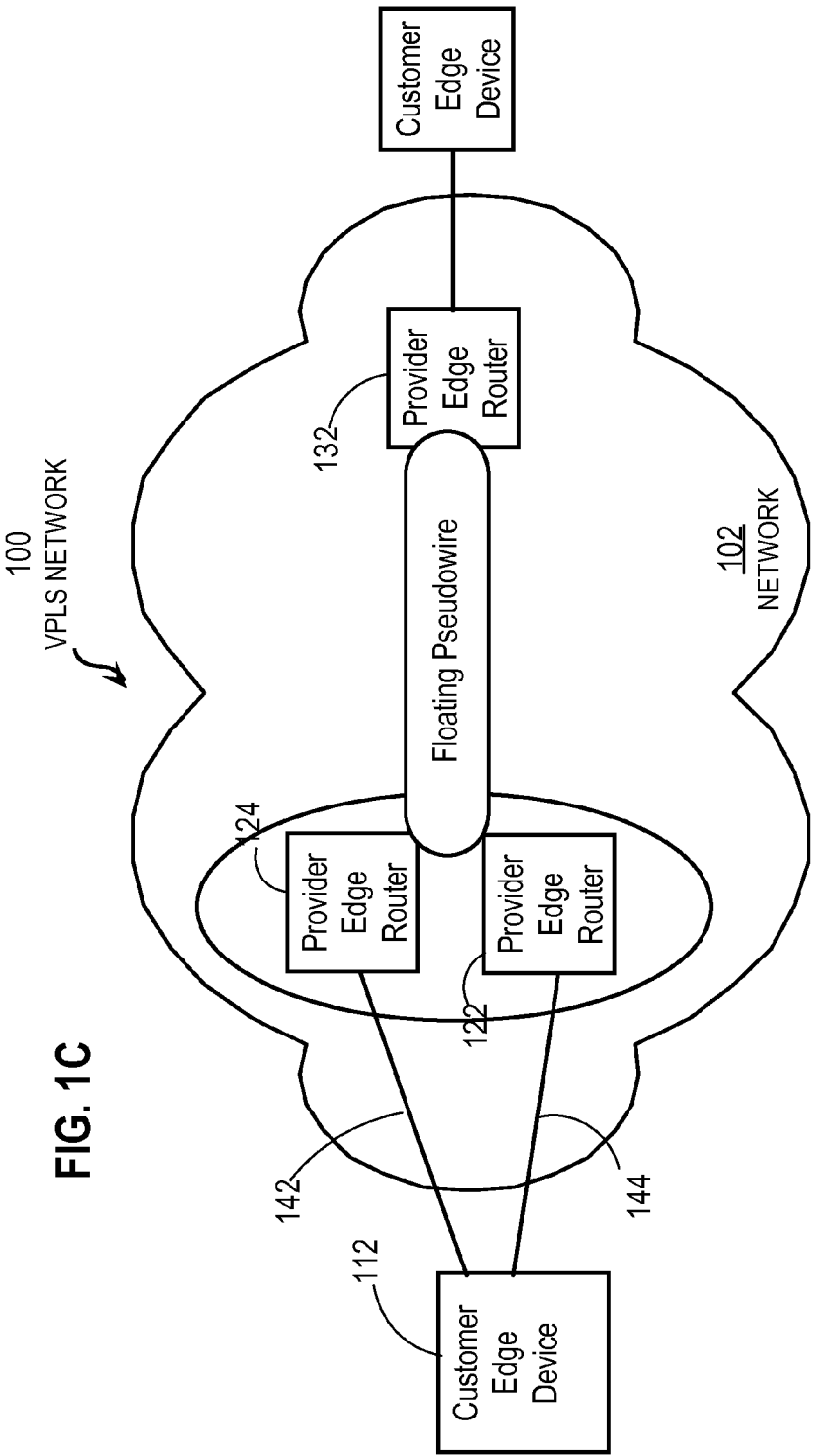
FIG. 1C illustrates an example floating pseudowire between a provider edge router and a redundancy group.

FIG. 1C illustrates a floating pseudowire. One endpoint of the floating pseudowire is Provider Edge Router 132 that is not a member of the redundancy group. The other endpoint of the floating pseudowire is the redundancy group comprised of Provider Edge Router 124 and Provider Edge router 122.

DETAILED DESCRIPTION

Figure 2:
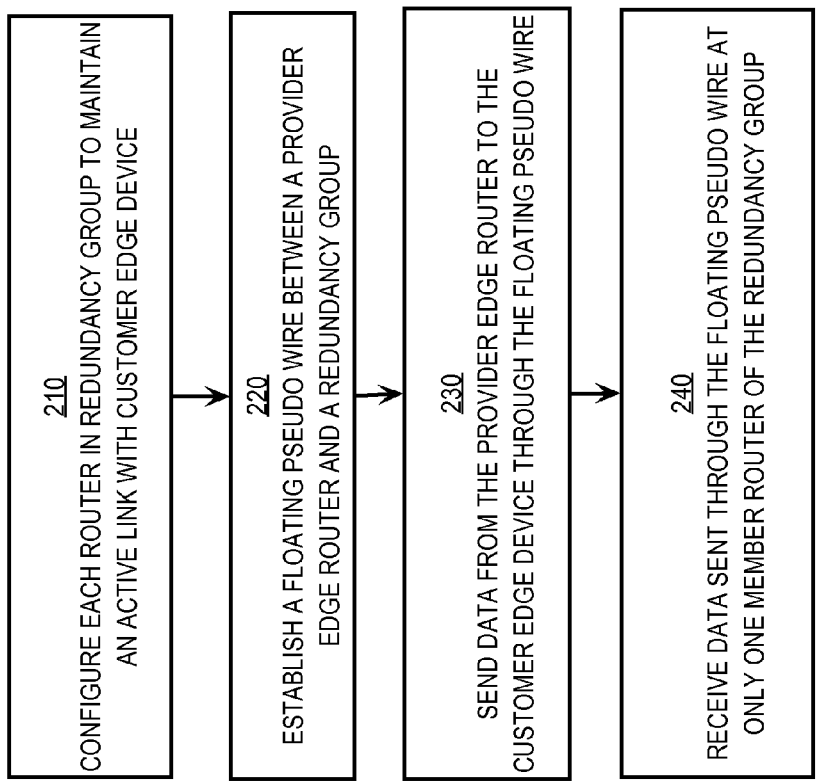
FIG. 2 illustrates configuring routers with floating pseudowires.

FIG. 2 is a flow chart showing a high level view of the steps of an embodiment of the approach described herein illustrating configuring routers with floating pseudowires. The provider edge routers that are connected to the same customer edge device form a redundancy group.

In Step 210, the edge routers in the redundancy group are configured to maintain an active link with the customer edge device.

In Step 220, a floating pseudowire is established between the redundancy group and another provider edge router that is not in the redundancy group. That is, the other endpoint of the floating pseudowire is a provider edge router that does not have a connection with the same multi-homed customer edge device, and thus, the other endpoint must forward traffic to the redundancy group to deliver frames to the customer edge device.

In Step 230, the provider edge router sends data to the customer edge device through the floating pseudowire.

In Step 240, only one provider edge router in the redundancy group receives the data through the floating pseudowire and forwards the data to the customer edge device.

Routing Advertisements

Figure 3:
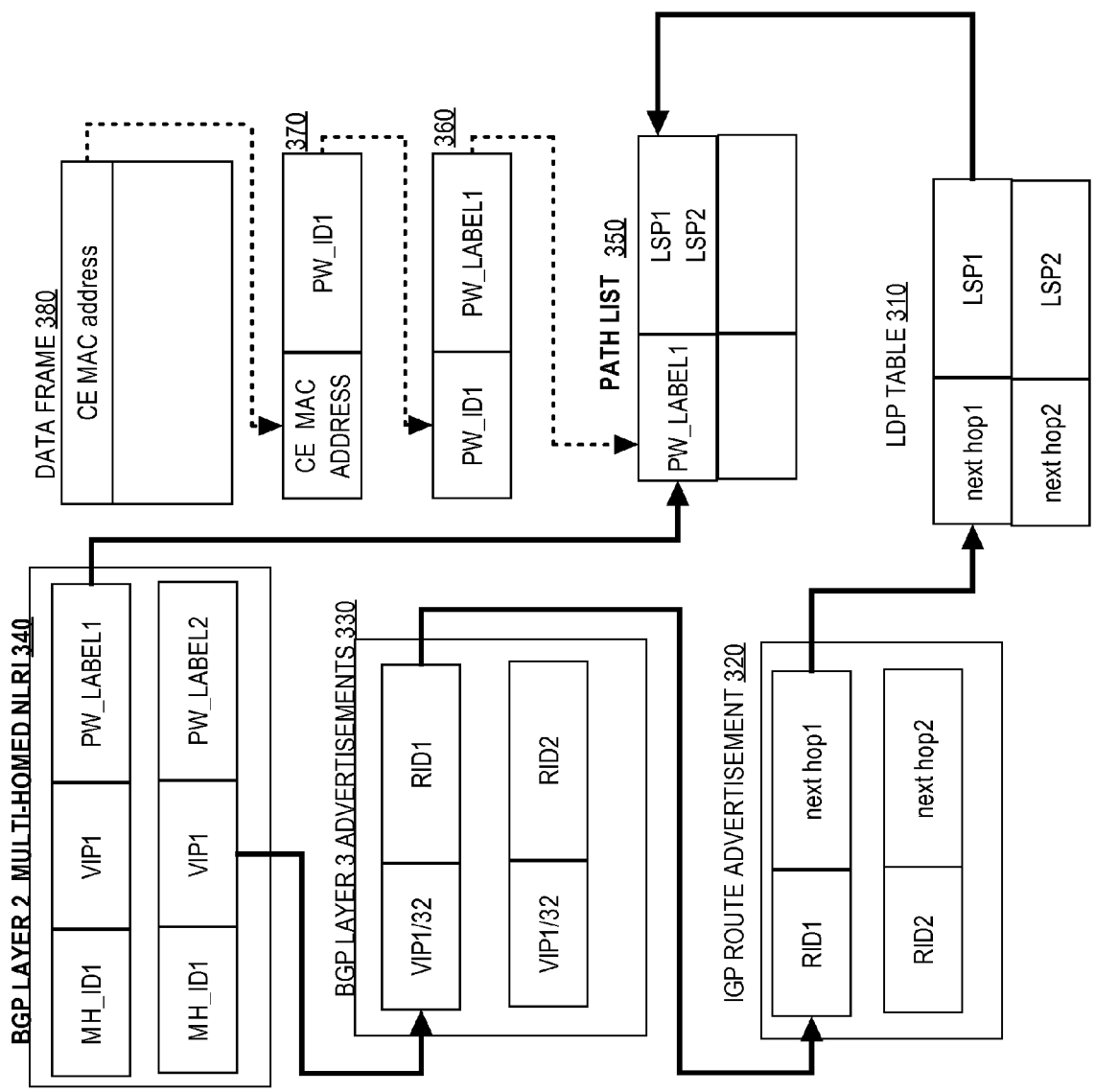
FIG. 3 illustrates example routing advertisements and tables that are constructed based on the advertisements.

FIG. 3 illustrates example routing advertisements and tables that are constructed based on the advertisements. For example, FIG. 3 illustrates the data received through network routing advertisements that are used to construct the pseudowire forwarding path list on the router receiving the advertisements. The left side of FIG. 3 shows elements of each advertisement that are described in this section.

IP connectivity among internal routers and edge routers is discovered and advertised, and MPLS labels are assigned to IP prefixes. In one embodiment, OSPF is used as the IP routing protocol. In an alternative embodiment, each of the internal and edge routers advertises presence in some IGP Route Advertisement 320. Each router that receives an IGP advertisement uses that information in addition to LDP label advertisements to construct an LDP table 310. The LDP table contains labels for IP prefixes.

Figure 4:
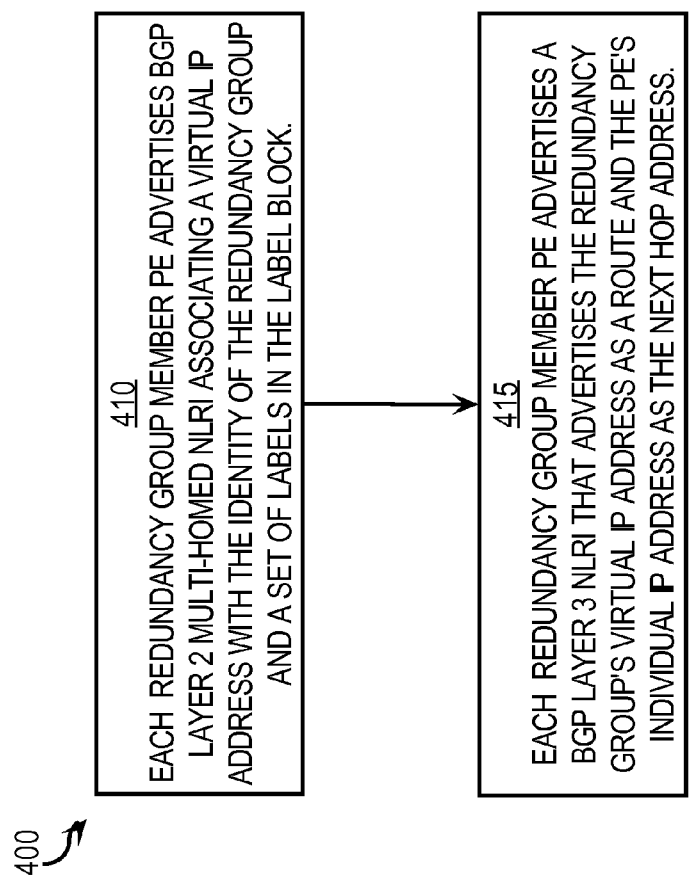
FIG. 4 illustrates sending Layer 2 and Layer 3 routing advertisements.

FIG. 4 illustrates sending Layer 2 and Layer 3 routing advertisements. For example, FIG. 4 shows steps 400 that provide routing information that is used for setting up a floating pseudowire to a redundancy group. In Step 410, each provider edge router in the redundancy group advertises a BGP Layer 2 multi-homing NLRI 340 on behalf of the redundancy group. The identity of the redundancy group is a virtual IP address that is placed in the next hop address field of the NLRI. In past approaches, a multi-homing NLRI may not populate the associated label block. However, in an embodiment, each provider edge router provides label block information within the NLRI. The label block stores a distinct label for each of the provider edge routers who will receive the advertisement. The label block is a contiguous block of storage containing an array of labels. A receiver of the advertisement determines which label it should use when communicating with the advertising router by using a receiver's identifier as an index into the array of labels. MPLS labels for the endpoints associated with the floating pseudowire may be established according to the algorithms and procedures described in RFC 4761.

The labels advertised in the label block may not be the same across PE's in the redundancy group; however, in an embodiment, a single label is used between the entire redundancy group and any other PE based on an agreement process described further below.

In Step 415, each PE in the redundancy group also sends out a BGP Layer 3 Advertisement 330 comprised of the redundancy group virtual IP address and the sending router's IP address. Each PE advertises the path to the virtual IP address with the same BGP Local Preference attribute so that any one of the advertised paths is equally likely to be selected for forwarding data. Advertising paths in this manner enables load balancing. A BGP Layer 3 message includes the prefix of a network that is reachable through the sending router. In this approach, the network prefix is the IP address representing the entire redundancy group.

Constructing the Path Table

Figure 5:
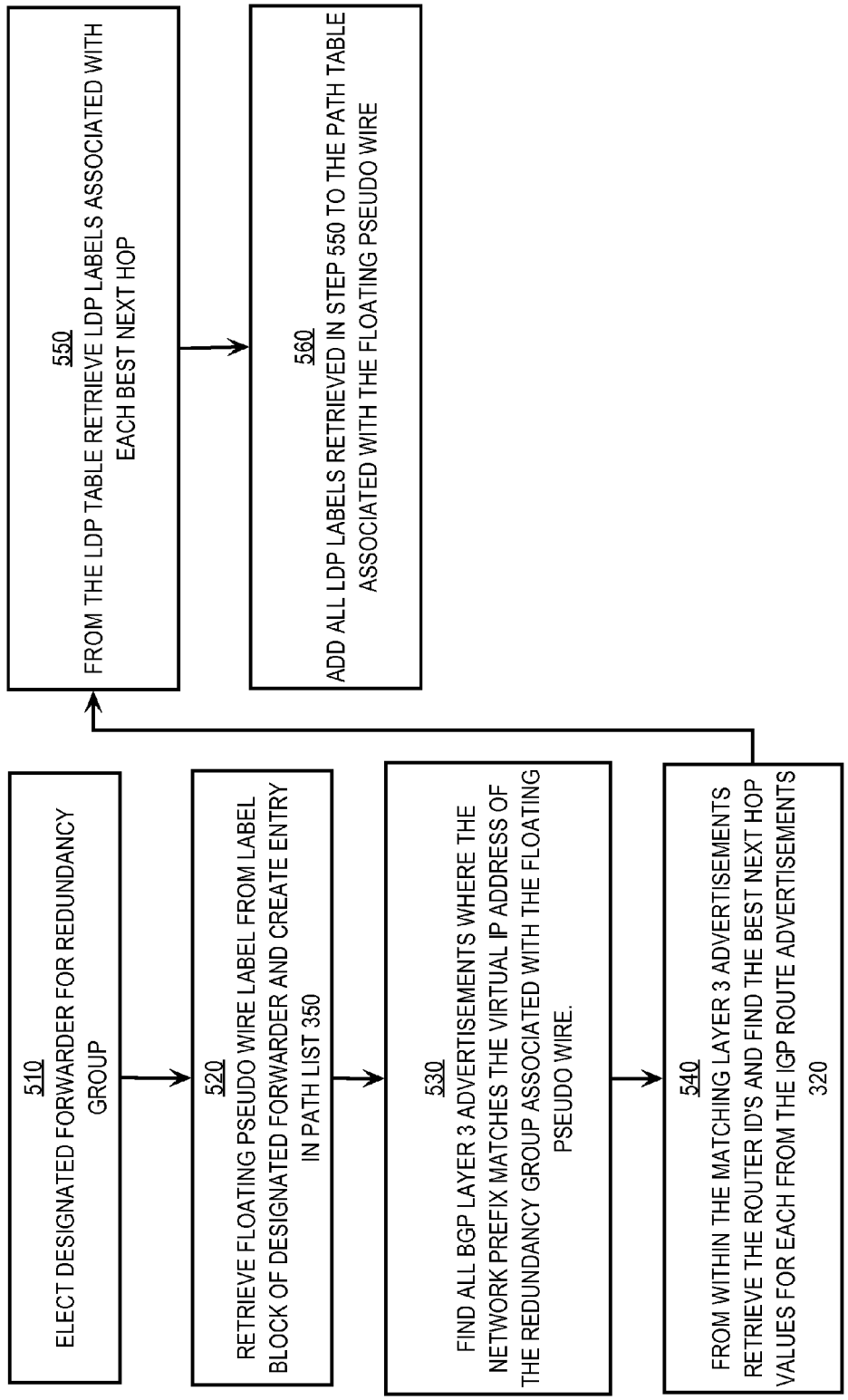
FIG. 5 illustrates using routing advertisement information to construct a path list.

FIG. 5 illustrates using routing advertisement information to construct a path list. In an embodiment, FIG. 5 is a flow diagram that shows the steps for constructing the path table from the information obtained through the routing advertisements. In the example, multiple NLRI's 340 have been received for the same multi-homing address MH_ID1, but only one pseudo wire label can be associated with that address.

In Step 510, a designated forwarder (DF) is elected for the redundancy group. A designated forwarder is one of the PE's in the redundancy group that represents the rest of the group, and only the labels in the label block of the DF's NLRI are used. For details on how the designated forwarder may be elected, see draft-ietf-l2vpn-vpls-multihoming.

In Step 520 the receiving provider edge router retrieves the pseudowire label to be used for forwarding data to the redundancy group from within the DF's NLRI label block. A new entry is created in the path table for that pseudowire, which is a floating pseudowire because one of its endpoints is a redundancy group. Thus, although multiple multi-home NLRI's have been received for MH_ID1, each associated with a potentially different set of labels, only one path table entry is created for the floating pseudowire, and only the label in the designated forwarder's label block is placed in the path list.

In Step 530, the IP addresses of all of the PE's that advertised the redundancy group's virtual IP address as the network prefix in a BGP Layer 3 advertisement are retrieved. For each of the router IP addresses retrieved in Step 530, the following steps are performed:

In Step 540, the IGP route advertisement information is used to lookup the best next hop address for a given PE address. In the example in FIG. 3, RID 1 represents the IP address of one of the provider edge routers, and next hop 1 represents the IP address of the internal router that is the best next hop. The best next hop IP address is then used to locate the label in the LDP table in Step 550. The label associated with each best next hop is added to the path list associated with the floating pseudowire in Step 560. Each label in the set of labels in the path list may identify a path to a different edge router. In other words, the labels in the path list do not necessarily list alternate paths to the same edge router.

When each of the PE's in the redundancy group construct their own path tables, each responds to the receipt of a BGP Layer 2 NLRI from a remote PE by indexing into the label block using the shared multi-homing identifier (MH_ID). In that way, all members of the redundancy group select the same pseudowire label to use when communicating with the advertising remote PE.

Using the Path List to Route Data

Figure 6:
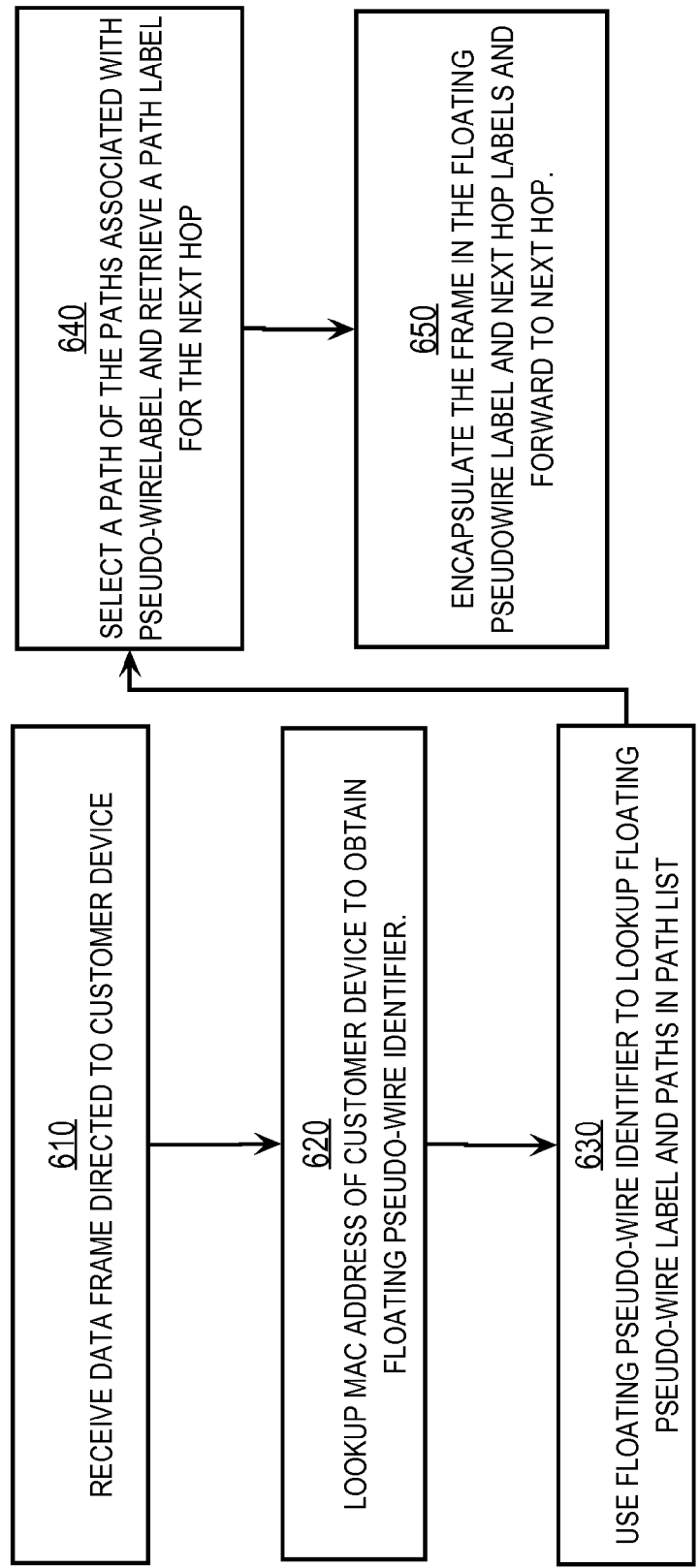
FIG. 6 illustrates using the routing tables constructed based on the routing advertisements to send a frame to a multi-homed customer edge device.

Referring again to FIG. 3, as data frames are received and inspected, an association 370 may be created between the source MAC address in the frame and the pseudowire identifier identifying the pseudowire on which the frame was received. The right side of FIG. 3 illustrates the steps in flow diagram FIG. 6 that shows the process for routing data using data structures that are constructed on the receiving provider edge router.

In Step 610, a data frame is received that is directed to a customer edge device. The destination MAC address in the packet is used to look up the associated pseudowire, which might be a floating pseudowire. In Step 620, the pseudowire identifier is used to retrieve the corresponding pseudowire label from a mapping of pseudowire identifiers to pseudowire labels 360.

In Step 630, the pseudowire label is used to find the list of alternate path labels in path list 350. In Step 650, a load balancing algorithm may be performed for selecting one of the alternate paths in the list. Load balancing may be performed based fields of the packet including IP Source Address, IP destination address, MAC source address, MAC destination address, UDP/TCP source or destination Port, or VLAN identifier. In Step 650, the data frame is first encapsulated in the pseudowire label, then encapsulated in the label of the selected path, and forwarded onto the next best hop.

Additional Disclosure

The disclosure also includes the following subject matter:

21. The method of claim 1, further comprising configuring each provider edge router to receive the particular data no more than once.

22. The method of claim 1, further comprising: configuring the first provider edge router to receive second data from the external device sent through a second provider edge router, wherein the second provider edge router is a member of the redundancy group; configuring the first provider edge router to store an association between a virtual network address of the redundancy group and a MAC address of the external device; configuring the first provider edge router to receive third data from the external device sent through a third provider edge router, wherein the third provider edge router is a member of the redundancy group and is not the same as the second provider edge router; configuring the first provider edge router not to change, in response to receiving the third data, the association between the virtual network address of the redundancy group and the MAC address of the external device.

23. The method of claim 12, wherein the routing message is a BGP routing protocol message.

24. The method of claim 12, wherein the first provider edge router and the redundancy group participate in a virtual provider LAN service (VPLS).

25. The method of claim 12, wherein the first provider edge router selecting a particular path of the plurality of paths associated with the floating pseudo wire further comprises running a load balancing algorithm.

26. The method of claim 25, wherein the load balancing algorithm is a hash function.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
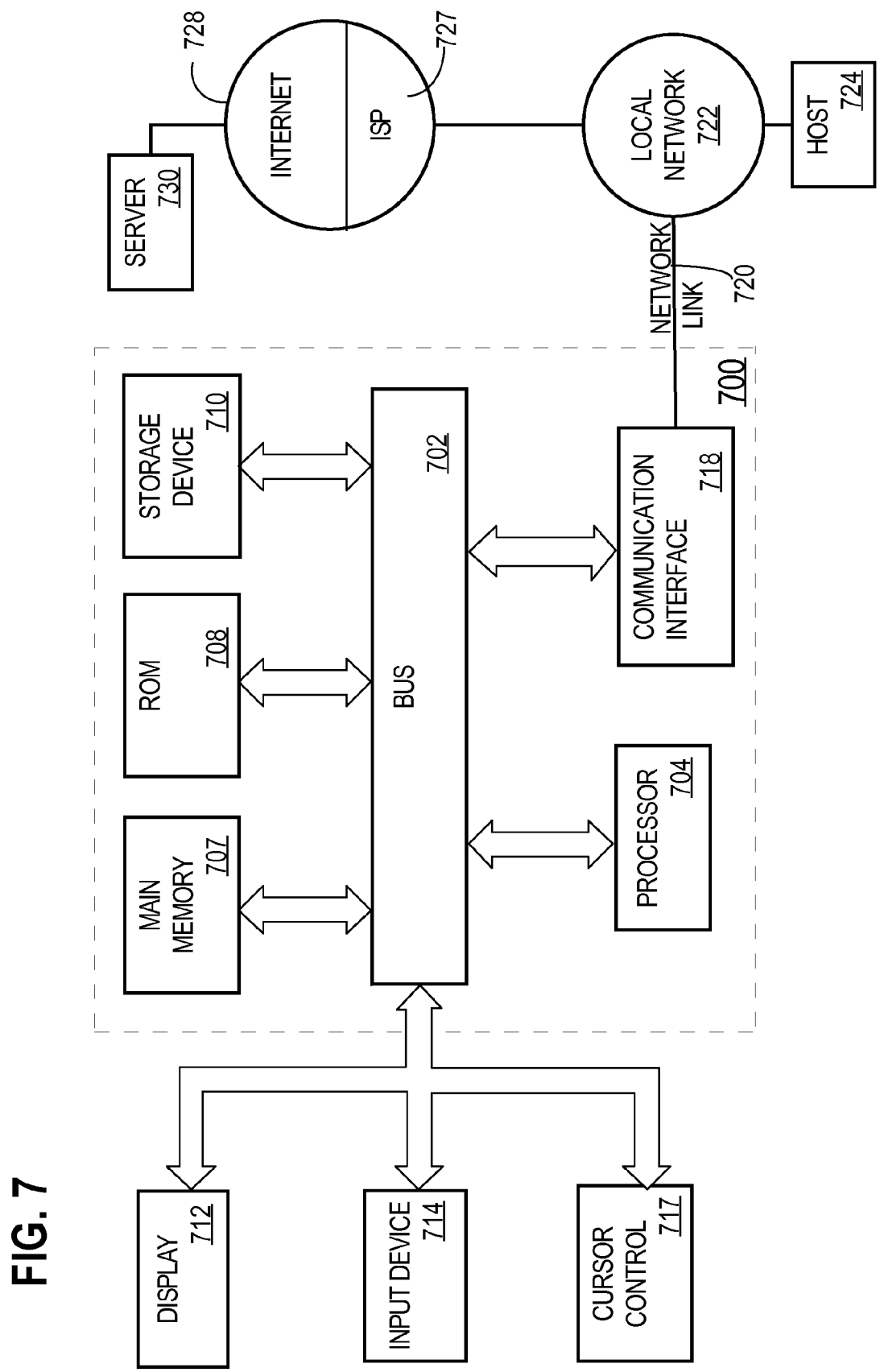
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   establishing a floating pseudowire between a first provider edge router and a redundancy group comprised of a plurality of provider edge routers, wherein each provider edge router in the redundancy group is configured to forward data toward an external device and is configured to maintain a direct active link to the external device;
   the first provider edge router sending particular data directed to the external device through the floating pseudowire to the redundancy group; wherein only one provider edge router in the redundancy group is configured to forward the particular data through one of direct active links to the external device.

2. The method of claim 1, the step of establishing a floating pseudowire further comprising creating a pseudowire path forwarding table, wherein an entry in the pseudowire path forwarding table for the floating pseudowire includes a plurality of labels, wherein a label, of the plurality of labels, corresponds to an MPLS path terminating on an edge router in the redundancy group.

3. The method of claim 2, further comprising receiving routing messages from each provider edge router in the redundancy group, wherein each routing message advertises a virtual network address of the redundancy group and a network address of said each provider edge router as a next hop address.

4. The method of claim 3, further comprising configuring each provider edge router in the redundancy group to advertise a common virtual network address in a routing protocol message, wherein the routing protocol message comprises a preference value associated with a route to the common virtual network address, wherein the preference value in the routing protocol message that is associated with the route to the virtual network address is the same for all provider edge routers in the redundancy group.

5. The method of claim 4, further comprising configuring each provider edge router in the redundancy group to include as the next hop address in the routing protocol message, the network address of said each provider edge router.

6. The method of claim 1, wherein the floating pseudowire is between two endpoints, wherein one endpoint among the two endpoints is associated with a virtual network address of the redundancy group.

7. The method of claim 1, further comprising configuring the plurality of provider edge routers in the redundancy group to send a network routing protocol message containing a base, offset, and size for a label block containing one or more pseudowire endpoint labels and a next hop attribute whose value is a virtual network address that is associated with the redundancy group.

8. The method of claim 1, further comprising:
   configuring the first provider edge router to receive from each of the plurality of provider edge routers in the redundancy group a network routing message containing a plurality of pseudowire labels and a virtual network address, which is associated with the redundancy group;
   configuring the first provider edge router to identify the network routing message sent by a particular provider edge router, wherein the particular provider edge router is a designated forwarder among the plurality of provider edge routers in the redundancy group;
   configuring the first provider edge router to retrieve from the network routing message a pseudowire label that is assigned to the first provider edge router and corresponds to the floating pseudowire between the first provider edge router and the redundancy group;
configuring the first provider edge router to store the pseudowire label in association with the virtual network address.

9. The method of claim 1, further comprising:
the first provider edge router receiving a particular data frame directed to the external device through the floating pseudowire to the redundancy group to perform:
based at least in part on the particular data frame, identifying a floating pseudowire identifier associated with a MAC address of the external device;
identifying a plurality of paths based on the floating pseudowire identifier;
selecting a path of the plurality of paths based on a load-balancing function;
forwarding the particular data frame on the selected path.

10. The method of claim 9, further comprising:
configuring the first provider edge router to retrieve a floating pseudowire label based on the floating pseudowire identifier and to encapsulate, in the floating pseudowire label, an Ethernet frame containing the particular data frame;
configuring the first provider edge router to encapsulate, in an LSP label associated with the selected path, an Ethernet frame containing the particular data frame that is encapsulated with the floating pseudowire label.

11. A method comprising:
establishing a single floating pseudowire between a first provider edge router and a redundancy group having a virtual network address and comprising of a plurality of provider edge routers, each of the plurality of provider edge routers maintaining an active link to an external device, by:
each provider edge router in the redundancy group sending a first network routing message containing a network address of said each provider edge router;
said each provider edge router sending a second network routing message containing the virtual network address of the redundancy group and the network address of said each provider edge router, wherein the network address is a next hop address;
in response to receiving the second network routing message from said each provider edge router, the first provider edge router storing an association between the virtual network address and the next hop address for said each provider edge router;
said each provider edge router sending a third network routing message containing the virtual network address and one or more pseudowire labels;
selecting from among the plurality of provider edge routers, a designated forwarder;
receiving the third network routing message sent by the designated forwarder;
storing an association between a pseudowire label, from the one or more pseudowire labels in the third network routing message, and a plurality of paths, wherein each path of the plurality of paths corresponds to a next hop address that is stored in association with the virtual network address in the third network routing message;
sending data from the first provider edge router to the external device through the single floating pseudowire to a redundancy group identified by the virtual network address by:

retrieving a pseudowire identifier based on a MAC address of the external device contained in data;
identifying a set of paths associated with the pseudowire identifier;
selecting a path of the set of paths based on a load-balancing function;
forwarding the data on the selected path to a particular provider edge router associated with the selected path;
the particular provider edge router forwarding the data to the external device.

12. An apparatus comprising:
one or more processors;
a floating pseudowire setup unit coupled to the one or more processors and configured to establish a floating pseudowire between a router and a redundancy group having a plurality of provider edge routers, each of the plurality of provider edge routers configured to forward data toward an external device and configured to maintain a direct active link to the external device;
a data forwarding unit configured to send particular data frame directed to the external device through the floating pseudowire to the redundancy group, wherein one provider edge router in the redundancy group is configured to forward the particular data frame through one of direct active links to the external device.

13. The apparatus of claim 12, wherein the floating pseudowire is between two endpoints, wherein one endpoint among the two endpoints is associated with a virtual network address of the redundancy group.

14. The apparatus of claim 12, further comprising a BGP Layer 3 advertiser unit that is configured to advertise a common virtual network address in a routing protocol message.

15. The apparatus of claim 14, wherein the advertiser unit is configured to include, in the routing protocol message, a unique network address of each provider edge router of the redundancy group as a next hop address.

16. The apparatus of claim 12, further comprising a path table manager unit configured to receive from each of the plurality of provider edge routers in the redundancy group a network routing message containing a plurality of pseudowire labels and a virtual IP address, to identify the network routing message sent by a particular provider edge router, wherein the particular provider edge router is a designated forwarder among the plurality of provider edge routers in the redundancy group, to retrieve from the network routing message a pseudowire label that corresponds to a first provider edge router, and to store the pseudowire label is association with the virtual IP address.

17. The apparatus of claim 12, wherein the data forwarding unit is configured to identify a floating pseudowire identifier associated with a MAC address of the external device, to identify a plurality of paths based on the floating pseudowire identifier, to select a path of the plurality of paths, and to forward the particular data frame on the selected path.

18. The apparatus of claim 12, further comprising a path table manager unit configured to receive second data from the external device sent through a second provider edge router, wherein the second provider edge router is a member of the redundancy group, to store an association between a virtual network address of the redundancy group and a MAC address of the external device, to receive third data from the external device sent through a third provider edge router, wherein the third provider edge router is a member of the redundancy group and is not the same as the second provider edge router.

* * * * *